(12) United States Patent
Okita (10) Patent No.: US 8,422,154 B2
(45) Date of Patent: Apr. 16, 2013

(54) LIGHT ADJUSTING APPARATUS

(75) Inventor: Tatsuhiko Okita, Akiruno (JP)

(73) Assignee: Olympus Corporation, Tokyo (JP)

(*) Notice: Subject to any disclaimer, the term of this patent is extended or adjusted under 35 U.S.C. 154(b) by 72 days.

(21) Appl. No.: 13/176,191

(22) Filed: Jul. 5, 2011

(65) Prior Publication Data
US 2012/0002309 A1    Jan. 5, 2012

(30) Foreign Application Priority Data
Jul. 5, 2010    (JP) .................................. 2010-152794

(51) Int. Cl.
*G02B 7/02*    (2006.01)
*G02B 26/02*    (2006.01)

(52) U.S. Cl.
USPC ........................... 359/824; 359/230; 359/234

(58) Field of Classification Search .......... 359/694–704, 359/811–830, 230, 234
See application file for complete search history.

(56) References Cited

U.S. PATENT DOCUMENTS
| | | | |
|---|---|---|---|
| 2009/0304378 A1* | 12/2009 | Okita | 396/508 |
| 2010/0253992 A1* | 10/2010 | Okita | 359/230 |
| 2011/0085223 A1* | 4/2011 | Ide et al. | 359/233 |
| 2011/0292484 A1* | 12/2011 | Ide | 359/230 |

FOREIGN PATENT DOCUMENTS
JP    HEI 10-020360    1/1998

\* cited by examiner

*Primary Examiner* — Mohammed Hasan
(74) *Attorney, Agent, or Firm* — Scully Scott Murphy & Presser, PC (57) ABSTRACT

A light adjusting apparatus according to the present invention includes a first substrate and a second substrate having an optical aperture, a rotating shaft member which has been rotatably installed with respect to the first substrate and the second substrate, a light adjusting unit which is joined to the rotating shaft member, and a driving unit which moves the light adjusting unit by driving to rotate the rotating shaft member. Light which passes through the optical aperture is adjusted by moving the light adjusting unit by rotating the rotating shaft member by the driving unit. The light adjusting unit has a notch, and the rotating shaft member and the light adjusting unit are joined at the notch.

18 Claims, 10 Drawing Sheets

END PORTION OF CIRCULAR
ARC SHAPE OF NOTCH

DIRECTION OF TURNING (PIVOTING) OF 301

FIG. 7B

END PORTION OF CIRCULAR
ARC SHAPE OF NOTCH

DIRECTION OF INSERTING

LIGHT ADJUSTING APPARATUS

CROSS-REFERENCE TO RELATED APPLICATION

The present application is based upon and claims the benefit of priority from the prior Japanese Patent Application No. 2010-152794 filed on Jul. 5, 2010; the entire contents of which are incorporated herein by reference.

BACKGROUND OF THE INVENTION

1. Field of the Invention
The present invention relates to a light adjusting apparatus.
2. Description of the Related Art
In recent years, with improved high-quality performance of a portable equipment having an image pickup function, and a small-size optical apparatus such as a micro video scope, with regard to optical elements such as a lens, an aperture, there has been increasing demand for an application of a focusing lens, a variable aperture instead of a conventional fixed focusing lens and a fixed aperture stop, and further small-sizing (slimming) of such optical elements has been sought.

For example, in Japanese Patent Application Laid-open Publication No. Hei 10-20360, a coil which is formed on a printed circuit board and a light-quantity adjusting apparatus in which the coil is used have been described. In a diaphragm blade which is to be used here, a shaft which is a rotating shaft member of the diaphragm blade and a magnet are joined integrally. The shaft and the magnet which are joined integrally are rotatably installed in a bearing hole which has been formed in an upper and a lower substrate, and are rotated by imparting a torque by the coil. A peculiarity of the abovementioned structure is that while using a thin substrate, a coil which can maintain a strong magnetic field is prepared, and further, an extremely thin light adjusting apparatus can be prepared by using the coil.

However, in a structure as described in Japanese Patent Application Laid-open Publication No. Hei 10-20360, it is necessary to insert the shaft directly into a shaft hole of the diaphragm blade.

Consequently, when an attempt is made to link the shaft and the diaphragm blade by press fitting, there is a possibility of the diaphragm blade getting deformed (in axial direction) at the time of press fitting, and there is a possibility of assembling becoming extremely difficult.

When the diaphragm blade is made further smaller (thinner) with the aim of small-sizing (slimming), such deformation of the diaphragm blade may occur all the more remarkably.

Particularly, in an extremely thin light adjusting apparatus as in this field of technology, when an outer diameter φ of the shaft is about 0.2 mm, and a thickness of the diaphragm blade is approximately 50 μm, since an effect of machining tolerance which cannot be eliminated easily becomes substantial, it is desirable to adopt a structure which hardly has an effect of the machining tolerance even when it exists.

SUMMARY OF THE INVENTION

The present invention has been made in view of the abovementioned circumstances, and an object of the present invention is to provide a light adjusting apparatus which can be assembled easily and in which, a product accuracy can be maintained to be high, while having a simple, low-price, light-weight, compact, and thin structure.

To solve the abovementioned issues and to achieve the object, the light adjusting apparatus according to the present invention includes
a first substrate and a second substrate in which, an optical aperture is formed,
at least one rotating shaft member which has been rotatably installed with respect to the first substrate and the second substrate,
at least one light adjusting unit which is joined to the rotating shaft member, and
a driving unit which moves the light adjusting unit, and
light which passes through the optical aperture is adjusted by turning the light adjusting unit to an optical aperture position and a retracted position of being retracted from the optical aperture by moving the light adjusting unit by rotating the rotating shaft member by the driving unit, and
the light adjusting unit has a notch, and
the rotating shaft member and the light adjusting unit are joined at the notch.

Moreover, according to a preferable aspect of the present invention, it is desirable that the notch and the light adjusting unit are joined such that a center of the rotating shaft member and a center of pivoting (center of rotational movement) of the light adjusting unit coincide.

Moreover, according to a preferable aspect of the present invention, it is desirable that the light adjusting apparatus further includes a frame member which covers the first substrate and/or the second substrate, and
an external shape of the light adjusting unit at a site where the frame member and the light adjusting unit make a contact is a circular arc shape, and
there is at least one aperture of the notch at a location of the outer shape other than the circular arc shape.

Furthermore, according to a preferable aspect of the present invention, it is desirable that a movement of the light adjusting unit is regulated by the rotating shaft member and a portion of the circular arc shape.

According to a preferable aspect of the present invention, it is desirable that a width of the notch is substantially same as a diameter of the rotating shaft member.

Moreover, according to a preferable aspect of the present invention it is desirable that a width of the notch is smaller than a diameter of the rotating shaft member, and the rotating shaft member is joined by an elastic force.

Furthermore, according to a preferable aspect of the present invention, it is desirable that the rotating shaft member and the light adjusting unit are joined by welding.

According to a preferable aspect of the present invention, it is desirable that the rotating shaft member and the light adjusting unit are joined by an adhesive.

Moreover, according to a preferable aspect of the present invention, it is desirable that a groove is formed in the rotating shaft member, and the rotating shaft member and the light adjusting unit are joined by the notch formed in the light adjusting unit being inserted into the groove.

Furthermore, according to a preferable aspect of the present invention, it is desirable that the rotating shaft member is formed by a circular cylindrical shaped magnet, and
a driving source is an electromagnetic driving source which includes a yoke and a winding coil, and
the rotating shaft member is rotated by using a magnetic force by the electromagnetic driving source.

According to the present invention, there can be provided a light adjusting apparatus which can be assembled easily and in which, a product-accuracy can be maintained to be high.

BRIEF DESCRIPTION OF THE DRAWINGS

FIG. 3A and FIG. 3B are diagrams describing a movement of a light adjusting unit of the light adjusting apparatus according to the first embodiment of the present invention, where.

FIG. 7A and FIG. 7B are diagrams describing a movement of a light adjusting unit of the light adjusting apparatus according to the second embodiment of the present invention, where.

DETAILED DESCRIPTION OF THE PREFERRED EMBODIMENTS

Exemplary embodiments of a light adjusting apparatus according to the present invention will be described below in detail by referring to the accompanying diagrams. However, the present invention is riot restricted to the embodiments described below. In the following description, same reference numerals are assigned to components which are same in the embodiments described below.

First Embodiment

A light adjusting apparatus according to a first embodiment of the present invention will be described below by referring to diagrams from FIG. 1 to FIG. 5.

Figure 1:
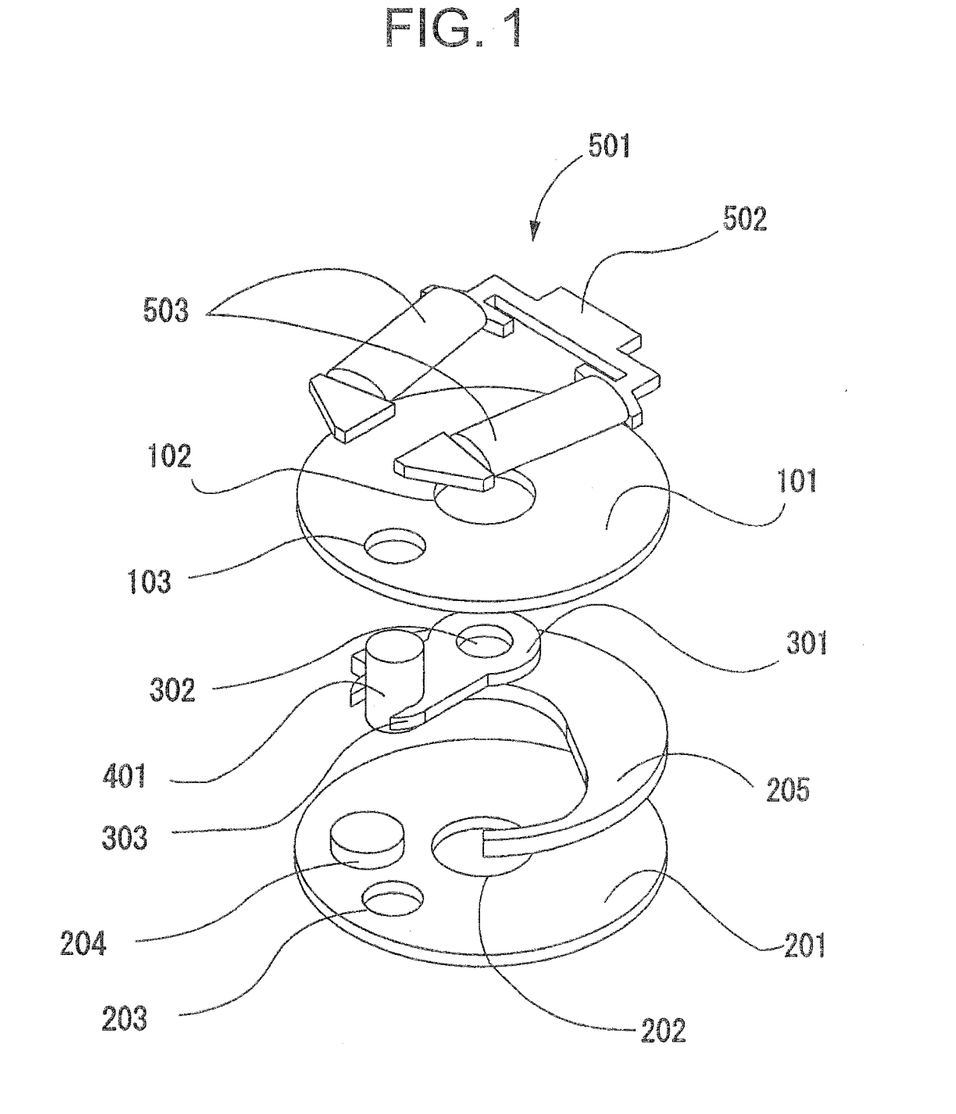
FIG. 1 is an exploded perspective view of a light adjusting apparatus according to a first embodiment of the present invention.

An exploded perspective view of the light adjusting apparatus according to the first embodiment is shown in FIG. 1.

The light adjusting apparatus according to the first embodiment includes a substrate 101 in which, an optical aperture 102 is formed, a substrate 201 in which, an optical aperture 202 is formed, a light adjusting unit 301 in which an optical aperture 302 is formed, a stopper 204 which stops a movement of the light adjusting unit 301, a spacer 205 which is disposed between the substrate 101 and the substrate 201, and which is for creating a space in which, a blade (the light adjusting unit 301) is pivotably movable around a rotating shaft member 401, and an electromagnetic driving source 501 which turns the light adjusting unit 301.

In the first embodiment, an outer diameter φ of the rotating shaft member 401 is about 0.2 mm and a thickness of (the blade of) the light adjusting unit 301 is approximately 50 μm.

Rotating shaft holes 103 and 203 are formed in the substrates 101 and 201 respectively. A notch 303 is provided in the light adjusting unit 301, and the light adjusting unit 301 joined to the rotating shaft member 401 which is formed of a magnetic material, at the notch 303.

Moreover, the electromagnetic driving source 501 is a member in which, winding coil portions 503 are provided to a yoke member 502.

Next, an assembly diagram of the light adjusting apparatus shown in FIG. 2 will be described below.

Figure 2:
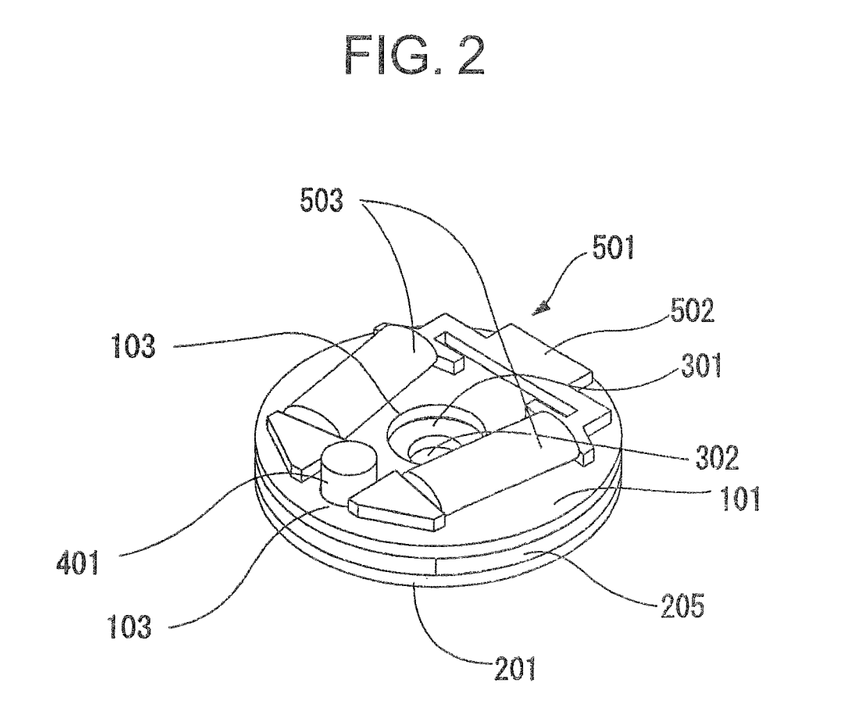
FIG. 2 is a perspective view showing an assembly diagram of the light adjusting apparatus according to the first embodiment.

As shown in FIG. 2, the rotating shaft member 401 which has been joined to the light adjusting unit 301 is engaged with the rotating shaft holes 103 and 203 formed in the substrate 101 and 201, and the light adjusting unit 301 is disposed between a space between the substrates 101 and 201, which is created by the spacer 205.

The electromagnetic driving source 501 is to be disposed on the substrate 101. However, in this case, the electromagnetic driving source 501 is to be disposed such that a front-end portion of the yoke member 502 comes to a position facing the rotating shaft member 401 which is magnetic.

Moreover, the light adjusting unit 301 is turned around the rotating shaft member 401 by the rotating shaft member 401 being rotated by the electromagnetic driving source 501. At this time, an arrangement is such that, by constraining the movement of the rotating shaft member 401 by the rotating shaft holes 103 and 203, the light adjusting unit 301 moves by being rotated around the rotating shaft member 401 properly.

Next, an operation of the light adjusting apparatus will be described below by using FIG. 3A and FIG. 3B. For making the description easy, the substrate 101 and the electromagnetic driving source 501 are omitted.

Figure 3A:
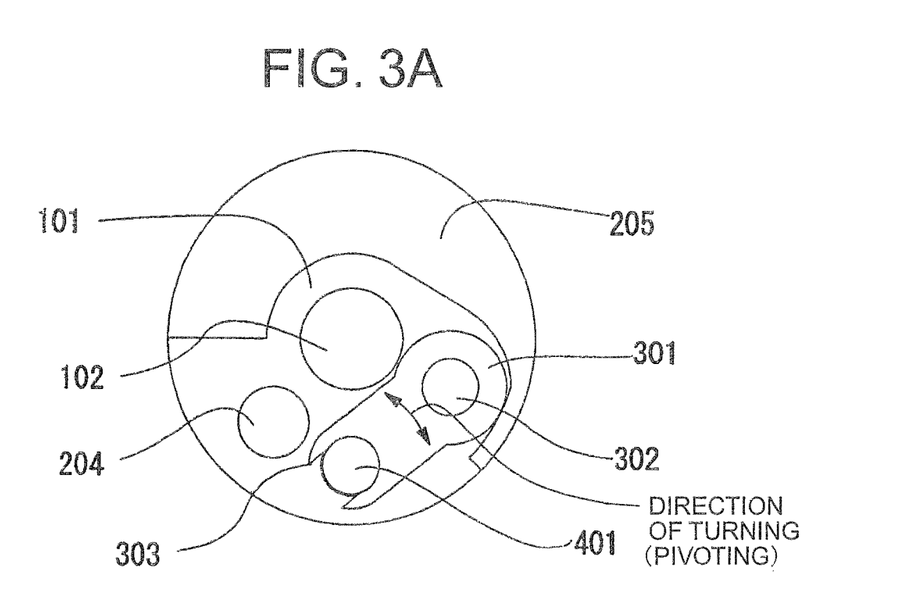
FIG. 3A is a diagram showing a state (retracted state) at a first stationary position.

FIG. 3A is a diagram showing a state in which, the light adjusting unit 301 is at a first stationary position retracted from the optical aperture 202 of the substrate 201 and the optical aperture 102 of the substrate 101. At this time, the light adjusting unit 301 makes a contact with the spacer 205, and stops at that position. An optical aperture of the light adjusting apparatus in this state is the optical aperture 102 formed in the substrate 101.

Figure 3B:
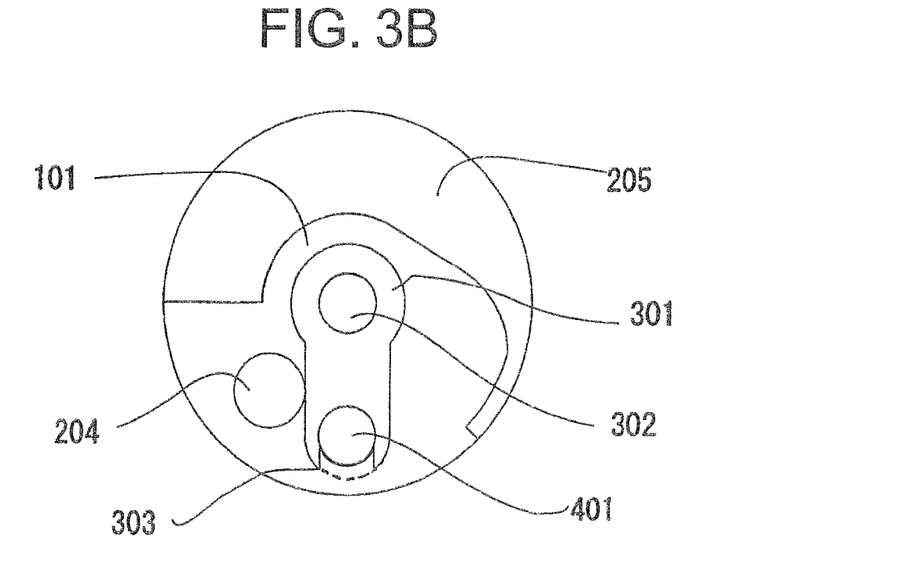
FIG. 3B shows a state (an optical aperture position) at a second stationary state.

Moreover, when the light adjusting unit 301 is at a second stationary position overlapping with the optical aperture 202 of the substrate 201 and the optical aperture 102 of the substrate 101 as shown in FIG. 3B, the light adjusting unit 301 makes a contact with the stopper 204 and is stopped. In this state, the optical aperture of the light adjusting apparatus is the optical aperture 302 formed in the light adjusting unit 301.

In the light adjusting apparatus according to the present invention, an arrangement is such that by applying an electric current to the winding coil 503 of the electromagnetic driving source 501, the rotating shaft member 401 which is magnetic, provided to the light adjusting unit 301 is turned around (rotated around) a central axis of rotation which is substantially orthogonal to a plane in FIG. 3A and FIG. 3B by a magnetic force generated from the front-end portion of the yoke member 502, and the light adjusting unit 301 can be moved to the first stationary position and the second stationary position alternately.

Next, peculiarities of the light adjusting apparatus according to the first embodiment will be described below by using FIG. 4A, FIG. 4B, FIG. 4C, and FIG. 4D.

Figure 4A:
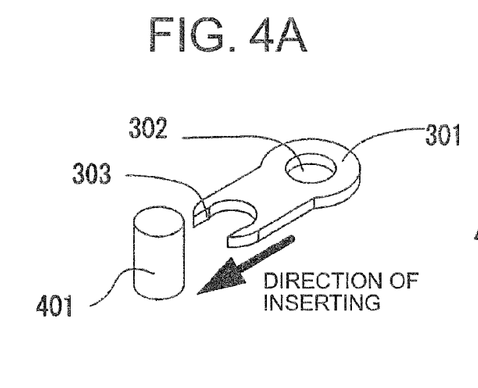
FIG. 4A and FIG. 4B are perspective views for describing a procedure for joining the light adjusting unit and a rotating shaft member of the light adjusting apparatus according to the first embodiment of the present invention.
Figure 4B:
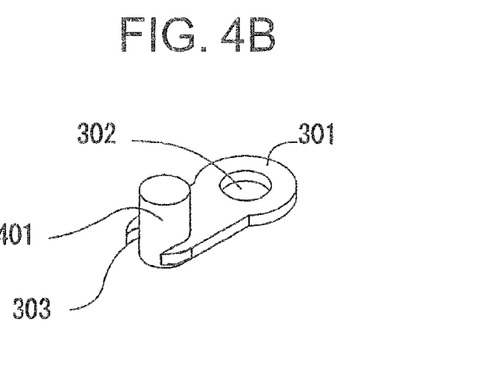

In the structure of the light adjusting apparatus according to the first embodiment, an arrangement is such that at the time of joining the rotating shaft member 401 and the light adjusting unit 301, the rotating shaft member 401 and the light adjusting unit 301 are engaged by fitting by inserting the notch 303 formed in the light adjusting unit 301 into the rotating shaft member 401 from a sideward direction (a direction of arrow in the diagram) as shown in FIG. 4A. A state in which, the light adjusting unit 301 and the rotating shaft member 401 are fitted is shown in FIG. 4B.

Figure 4C:
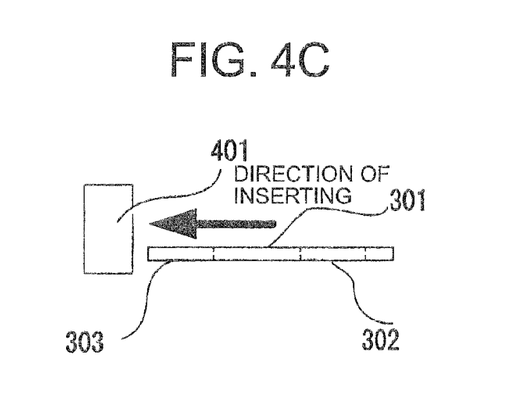
FIG. 4C and FIG. 4D are side views for describing a procedure for joining the light adjusting unit and the rotating shaft member of the light adjusting apparatus according to the first embodiment of the present invention.
Figure 4D:
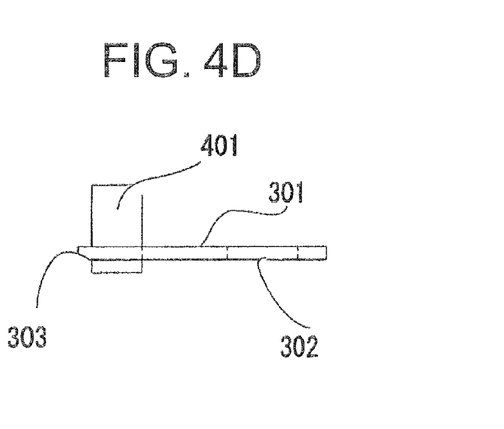

Moreover, for reference, a side view for describing a procedure for joining is shown FIG. 4C and FIG. 4D. FIG. 4C is a diagram before the light adjusting unit 301 and the rotating shaft member 401 are fitted, and the light adjusting unit 301 is slid in the direction of arrow shown in the diagram and the rotating shaft 401 is fitted into the notch 303. FIG. 4D is a diagram after the rotating shaft member 401 is fitted in the light adjusting unit 301.

Moreover, as a method for fixing the rotating shaft member 401 and the light adjusting unit 301 after fitting, using an adhesive and welding are available. Moreover, a width of the notch 303 may be let to be smaller than the diameter of the rotating shaft member 401, and the rotating shaft member 401 and the light adjusting unit 301 may be fixed by an elastic force of the light adjusting unit 301.

Here, advantage of the abovementioned structure will be described below.

As a conventional method of joining, a method in which, a shaft hole is provided in the light adjusting unit 301, and the rotating shaft member 401 is inserted (press-fitted) in the shaft hole 401 has been available.

However, for making the light adjusting apparatus thin, it is necessary to form the light adjusting unit 301 to be thin. When the light adjusting unit 301 is formed to be thin, there is a possibility of the light adjusting unit 301 getting deformed in an optical axial direction when the rotating shaft member 401 is inserted (press-fitted). With the light adjusting unit 301 being deformed in such manner, when an attempt is made to assemble the light adjusting apparatus practically, and to move the light adjusting unit 301, a possibility that the light adjusting unit 301 makes a contact with the substrate 101 or the substrate 202, and cannot move is high. Due to such possibility, joining of the light adjusting unit 301 and the rotating shaft member 401 is extremely difficult.

On the other hand, when an arrangement is made by providing the notch 303 to the light adjusting unit 301 as in the first embodiment as described above, it is possible to fit the light adjusting unit 301 to the rotating shaft member 401 from the sideward direction. When this method is used, there is no deformation of the light adjusting unit 301 in the optical axial direction as it was there in a conventional method, and it is possible to join the light adjusting unit 301 to be perpendicular to the rotating shaft member 401.

In this manner, by using the method of joining according to the first embodiment of the present invention, since the possibility of deformation of the light adjusting unit 301 in the optical axial direction at the time of joining as it was in the conventional method is not there, it is possible to let the assembling to be extremely easy while maintaining high quality.

Moreover, other advantages of the light adjusting apparatus according to the first embodiment of the present invention are as described below.

When further small-sizing of the light adjusting apparatus is intended, apart from small-sizing and slimming of the light adjusting unit which are absolutely necessary, small-sizing of the rotating shaft member (401) also becomes indispensable. As various members go on becoming smaller, limitations on dimensional tolerance at the time of processing (machining) of members become stricter (for example, when a magnetic material such as a magnet is used for the rotating shaft member 401, as machining and molding become difficult as compared to machining and molding of normal metal, limitations on dimensional tolerance become further stricter). Therefore, when the conventional method of joining is used, it is difficult to match the diameter of the shaft hole of the light adjusting unit and the diameter of the rotating shaft member, and the shaft hole of the light adjusting unit has to be adjusted (to be machined again) to match with the diameter of the rotating shaft every time, which is an extremely troublesome job.

However, when the method of joining according to the first embodiment of the present invention is used, since it is possible to allow limitations due to the dimensional tolerance of the rotating shaft member by (in) the notch, assembling becomes easier.

Second Embodiment

Next, a second embodiment of the present invention will be described below by using FIG. 5 through FIG. 8A, and FIG. 8B.

Figure 5:
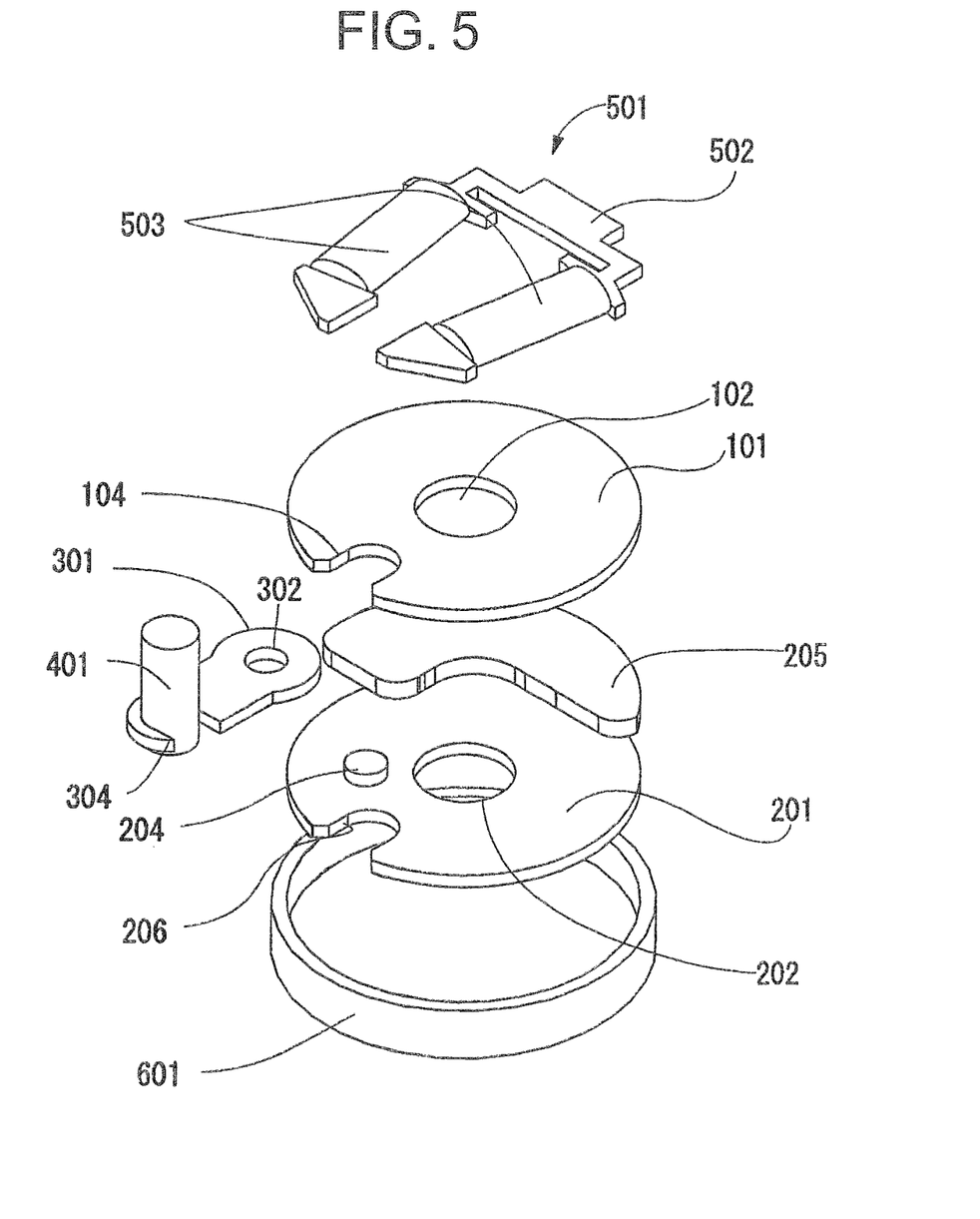
FIG. 5 is an exploded perspective view of a light adjusting apparatus according to a second embodiment of the present invention.

FIG. 5 is an exploded perspective view.

Moreover, same reference numerals are assigned to structural components which are equivalent to the structural components in the first embodiment.

A light adjusting apparatus according to the second embodiment of the present invention includes a substrate 101 in which, an optical aperture 102 is formed, a substrate 201 in which, an optical aperture 202 is formed, a light adjusting unit 301 in which, an optical aperture 302 is formed, a stopper 204 which stops a movement of the light adjusting unit 301, a spacer 205 which is disposed between the substrate 101 and the substrate 201, and which is for creating a space in which, a blade (the light adjusting unit 301) is pivotably movable around a rotating shaft member 401, and an electromagnetic driving source 501 which turns the light adjusting unit 301.

Notches 104 and 206 are formed in the substrates 101 and 201 respectively. A notch 304 is provided in the light adjusting unit 301, and the light adjusting unit 301 is joined to the rotating shaft member 401 which is formed of a magnetic material, by the notch 304 provided in the light adjusting unit 301. Moreover, the electromagnetic driving source 501 is a member in which, winding coil portions 503 are provided to a yoke member 502.

Next, a procedure for assembling the light adjusting apparatus will be described below by using FIG. 6A and FIG. 6B.

Figure 6A:
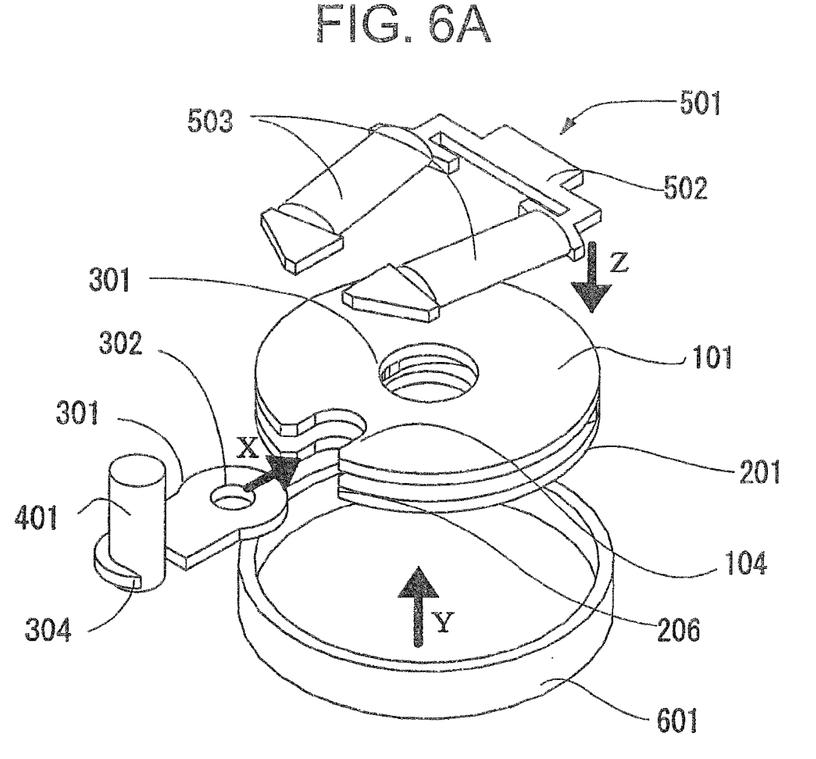
FIG. 6A and FIG. 6B are perspective views for describing a procedure for assembling the light adjusting apparatus according to the second embodiment.

FIG. 6A is a diagram showing a state before assembling, and the substrate 101, the substrate 201, and the spacer 205 are joined first. In this case, the light adjusting unit 301 is to be inserted (in a direction of arrow X) in a space between the substrate 101 and the substrate 201 formed by the spacer 205, and the rotating shaft member 401 is to be inserted in the notches 104 and 206 formed in the substrates 101 and 201 respectively.

Thereafter, a frame member 601 is to be fitted in (a direction of arrow Y), and the electromagnetic driving source 501 is to be disposed (a direction of arrow Z) on the substrate 101.

It is necessary to fit the frame member 601 so that the light adjusting unit 301 which has been inserted does not drop. An order of carrying out processes in the direction of arrow Y and in the direction of arrow Z is voluntary.

Figure 6B:
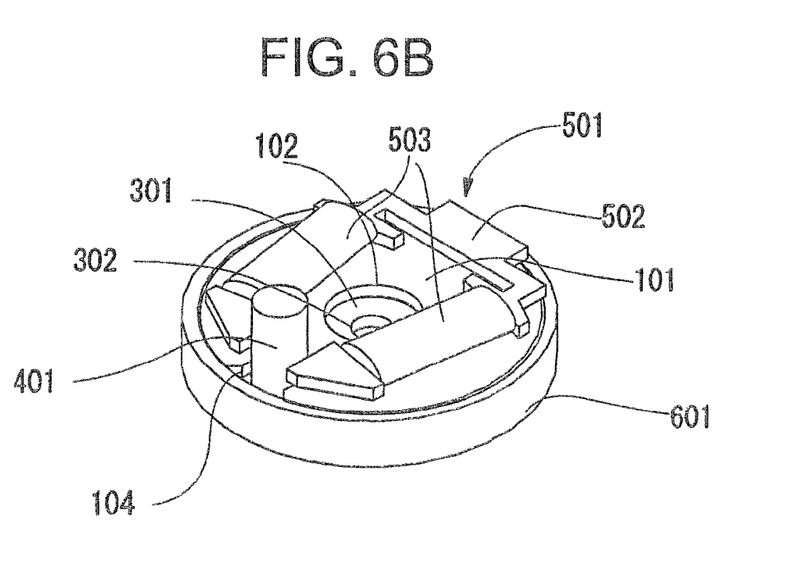

FIG. 6B is a diagram after assembling.

As shown in FIG. 6B, the electromagnetic driving source 501 is to be disposed such that a front-end portion of the yoke member 502 comes to a position facing the rotating shaft member 401. Moreover, the light adjusting unit 301 is turned around the rotating shaft member 401 by rotating the rotating shaft member 401 by the electromagnetic driving source 501.

In this case, the second embodiment differs from the first embodiment at a point that the movement of the light adjusting unit 301 is regulated (free movement of the light adjusting unit 301 is prevented) by the rotating shaft member 401 making a contact with the notches 104 and 206 formed in the substrates 101 and 201 respectively, and an end portion having a circular arc shape around the rotating shaft member 401 which is joined to the light adjusting unit 301, making a contact with the frame member 601.

Next, a movement of the light adjusting apparatus according to the second embodiment will be described below by using FIG. 7A and FIG. 7B. For making the description easy, the substrate 101 and the electromagnetic driving source 501 are omitted. Moreover, an operation principle being basically same as of the first embodiment, repeated distribution will be omitted.

Figure 7A:
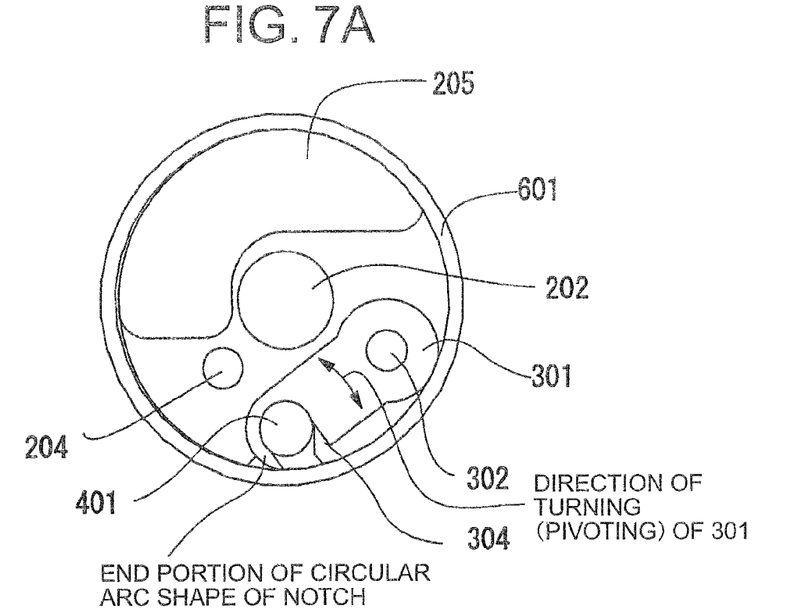
FIG. 7A is a diagram showing a state (retracted state) at a first stationary position.

FIG. 7A is a diagram showing a state at a first stationary position, in which, the light adjusting unit 301 has retracted from the optical aperture 202 of the substrate 201 and the optical aperture 102 of the substrate 101. At this time, the light adjusting unit 301 makes a contact with the frame member 601, and stops at that position. In the second embodiment, the position of the light adjusting unit 301 is regulated by the frame member 601. However, the position of the light adjusting unit 301 may be regulated by the spacer 205 similarly as in the first embodiment. An optical aperture of the light adjusting apparatus in this state is the optical aperture 102 formed in the substrate 101.

Figure 7B:
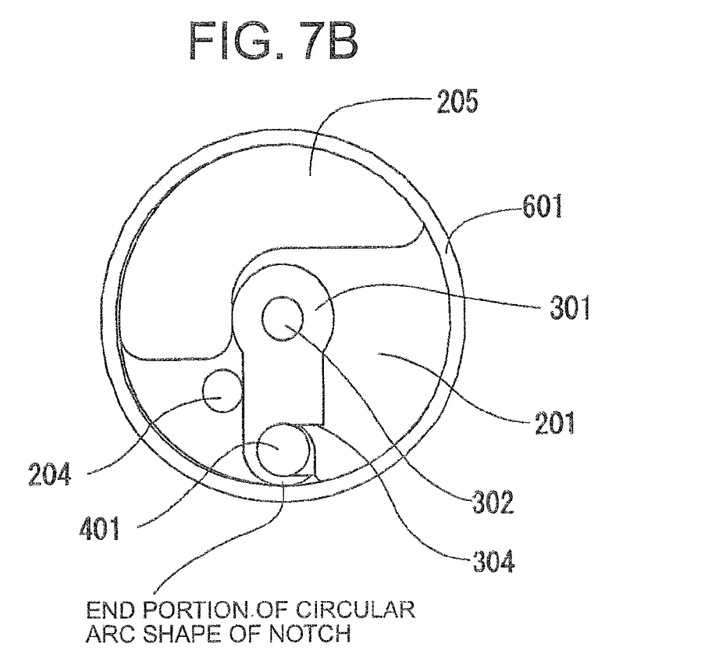
FIG. 7B shows a state (an optical aperture position) at a second stationary state.

When the light adjusting unit 301 is at a second stationary position overlapping with the optical aperture 202 of the substrate 201 and the optical aperture 102 of the substrate 101 as shown in FIG. 7B, the light adjusting unit 301 makes a contact with the stopper 204, and is stopped. In this state, the optical aperture of the light adjusting apparatus is the optical aperture 302 formed in the light adjusting unit 301.

Even in the second embodiment, an arrangement is similar as in the first embodiment, such that by applying an electric current to the winding coil 503 of the electromagnetic driving source 501, the rotating shaft member 401 which is magnetic, is turned around (rotated or pivoted) a central axis of rotation which is substantially orthogonal to a plane of FIG. 7A, by rotating by a magnetic force which is generated from the front-end portion of the yoke member 502, and the light adjusting unit 301 can be moved to the first stationary position and the second stationary position alternately.

Here, the second embodiment differs from the first embodiment at a point that the light adjusting unit 301 is regulated not only by the shaft holes (notches) formed in the substrates 101 and 201 respectively, but also by the frame member 601.

Therefore, it is desirable that a shape of the light adjusting unit 301 around the rotating shaft member 401 is a circular arc shape as shown in FIG. 7A and FIG. 7B. The reason being the rotational movement becomes smooth. As in the first embodiment, when the shape of the light adjusting unit 301 around the rotating shaft member 401 is not a circular arc shape, and the end portion of the notch 304 has made a contact with the frame member 601, there is a possibility that the frame member 601 and the light adjusting unit 301 are caught, resulting in a possibility that the rotational movement is not smooth.

Figure 8A:
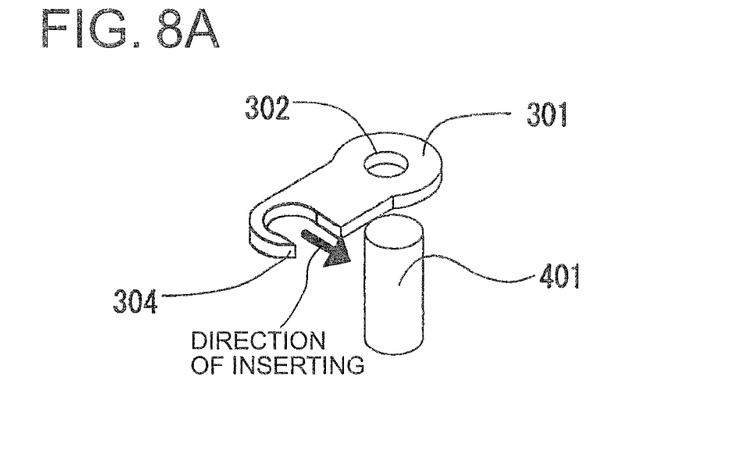
FIG. 8A and FIG. 8B are perspective views for describing a procedure for joining the light adjusting unit and a rotating shaft member of the light adjusting apparatus according to the second embodiment of the present invention.
Figure 8B:
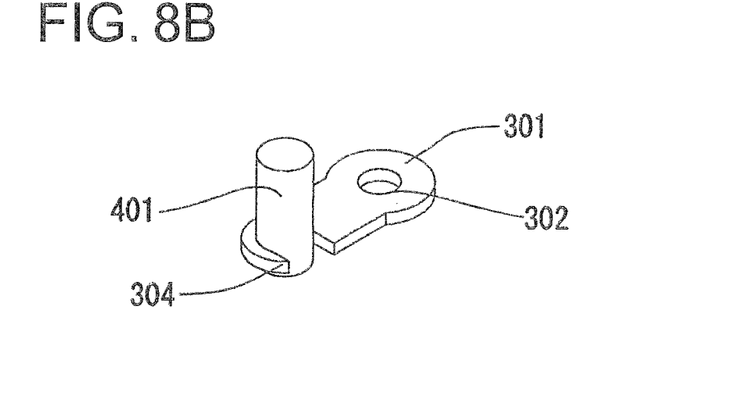

Next, an example of a procedure for joining the light adjusting unit 301 and the rotating shaft member 401 will be described below by using FIG. 8A and FIG. 8B.

The light adjusting unit 301 has a site at which, an external shape is a circular arc shape, around a site at which the rotating shaft member 401 is to be joined, and a bottom portion of the notch 304 being formed to be circular arc shaped, the light adjusting unit 301 is formed to be straight toward an end of an opening of the notch. Moreover, a center of the rotating shaft member 401 and a center of the circular arc shape coincide substantially.

Moreover, although it is not shown in the diagram, the bottom portion of the notch 304 may be formed to be a straight portion other than to have a circular arc shape.

The main advantage of the structure according to the second embodiment being simplified assembling similarly as in the first embodiment, the description thereof will be omitted.

However, when an arrangement is made such that the light adjusting unit 301 to which, the rotating shaft member 401 has been joined, is inserted from the sideward direction into a device to which, the substrates 101 and 201, and the spacer 205 are joined as in the abovementioned structure, and the frame member 601 is to be fitted, it is desirable to let the shape of the notch 304 to be such that an outer side thereof is circular arc shaped as in the abovementioned structure for preventing the catch.

Another Embodiment

In the first embodiment and the second embodiment described so far, as a method of joining the rotating shaft member 401 and the light adjusting unit 301, the notch 304 has been formed only in the light adjusting unit 301. However, a notch 402 may also be formed in the rotating shaft member 401 similarly as the notch 304 in the light adjusting unit 301, and the light adjusting unit 301 may be fixed by fitting in the notch 402 of the rotating shaft member 401 as shown in FIG. 9A and FIG. 9B.

As an effect of adopting such an arrangement, the rotating shaft member 401 and the light adjusting unit 301 are fixed mutually in the notches after joining, a problem such as shifting of a position of joining in an optical axial direction does not arise, and it possible to join at the desired position.

Figure 9A:
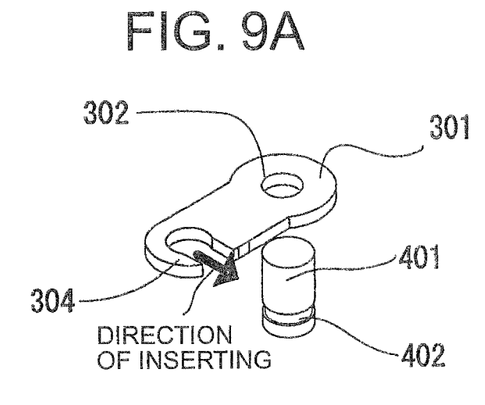
FIG. 9A and FIG. 9B are perspective views for describing an example of a procedure for joining a light adjusting unit and a rotating shaft member of a light adjusting unit according to another embodiment of the present invention.
Figure 9B:
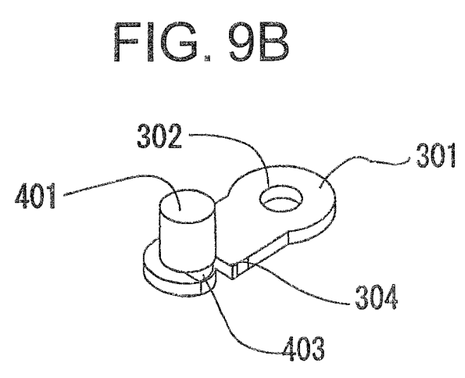
Figure 10:
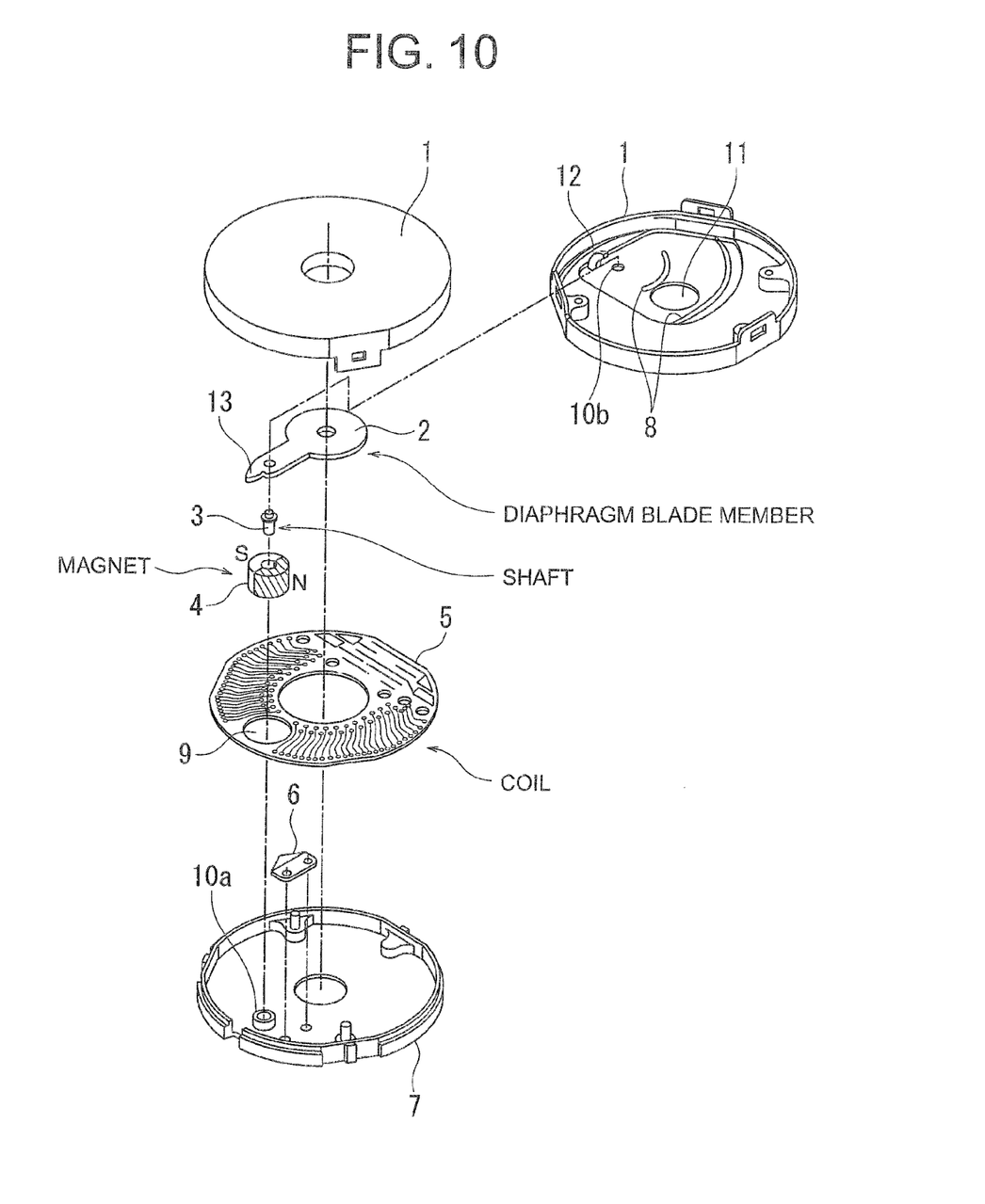
FIG. 10 is an exploded perspective view of an example of a structure of a conventional light adjusting apparatus.

FIG. 9A is a diagram showing a state before joining and FIG. 9B is a diagram showing a state after joining.

As it has been described above, the light adjusting apparatus according to the present invention is useful as a light adjusting apparatus or an optical apparatus in a field of small-size optical apparatuses because assembling thereof is easy and a product accuracy can be maintained to be high while having a simple, low-price, light weight, compact, and slim structure.

According to the present invention, it is possible to provide a light adjusting apparatus which can be assembled easily and in which, a product accuracy can be maintained to be high, while having a simple, low-price, light-weight, compact, and thin structure.

What is claimed is:

1. A light adjusting apparatus comprising:
   a first substrate and a second substrate in which, an optical aperture is formed;

at least one rotating shaft member which has been rotatably installed with respect to the first substrate and the second substrate;

at least one light adjusting unit which is joined to the rotating shaft member; and a driving unit which moves the light adjusting unit, wherein light which passes through the optical aperture is adjusted by turning the light adjusting unit to an optical aperture position and a retracted position of being retracted from the optical aperture by moving the light adjusting unit by rotating the rotating shaft member by the driving unit, and the light adjusting unit has a notch, and the rotating shaft member and the light adjusting unit are joined at the notch.

2. The light adjusting apparatus according to claim 1, wherein the notch and the light adjusting unit are joined such that a center of the rotating shaft member and a center of pivoting of the light adjusting unit coincide.

3. The light adjusting apparatus according to claim 2, further comprising:

a frame member which covers the first substrate and/or the second substrate, wherein an external shape of the light adjusting unit at a site where the frame member and the light adjusting unit make a contact is a circular arc shape, and there is at least one aperture of the notch at a location of the outer shape other than the circular arc shape.

4. The light adjusting apparatus according to claim 3, wherein a movement of the light adjusting unit is regulated by the rotating shaft member and a portion of the circular arc shape.

5. The light adjusting apparatus according to claim 4, wherein a width of the notch is substantially same as a diameter of the rotating shaft member.

6. The light adjusting apparatus according to claim 4, wherein a width of the notch is smaller than a diameter of the rotating shaft member, and the rotating shaft member is joined by an elastic force.

7. The light adjusting apparatus according to claim 6, wherein the rotating shaft member and the light adjusting unit are joined by welding.

8. The light adjusting apparatus according to claim 6, wherein the rotating shaft member and the light adjusting unit are joined by an adhesive.

9. The light adjusting apparatus according to claim 8, wherein a groove is formed in the rotating shaft member, and the rotating shaft member and the light adjusting unit are joined by the notch formed in the light adjusting unit being inserted into the groove.

10. The light adjusting apparatus according to claim 8, wherein the rotating shaft member is formed by a circular cylindrical shaped magnet, and a driving source is an electromagnetic driving source which includes a yoke and a winding coil, and the rotating shaft member is rotated by using a magnetic force by the electromagnetic driving source.

11. The light adjusting apparatus according to claim 1, further comprising:

a frame member which covers the first substrate and/or the second substrate, wherein an external shape of the light adjusting unit at a site where the frame member and the light adjusting unit make a contact is a circular arc shape, and there is at least one aperture of the notch at a location of the outer shape other than the circular arc shape.

12. The light adjusting apparatus according to claim 1, wherein a movement of the light adjusting unit is regulated by the rotating shaft member and a portion of the circular arc shape.

13. The light adjusting apparatus according to claim 1, wherein a width of the notch is substantially same as a diameter of the rotating shaft member.

14. The light adjusting apparatus according to claim 1, wherein a width of the notch is smaller than a diameter of the rotating shaft member, and the rotating shaft member is joined by an elastic force.

15. The light adjusting apparatus according to claim 1, wherein the rotating shaft member and the light adjusting unit are joined by welding.

16. The light adjusting apparatus according to claim 1, wherein the rotating shaft member and the light adjusting unit are joined by an adhesive.

17. The light adjusting apparatus according to claim 1, wherein a groove is formed in the rotating shaft member, and the rotating shaft member and the light adjusting unit are joined by the notch formed in the light adjusting unit being inserted into the groove.

18. The light adjusting apparatus according to claim 1, wherein the rotating shaft member is formed by a circular cylindrical shaped magnet, and a driving source is an electromagnetic driving source which includes a yoke and a winding coil, and the rotating shaft member is rotated by using a magnetic force by the electromagnetic driving source.

* * * * *